United States Patent
Okamura (10) Patent No.: US 7,355,869 B2
(45) Date of Patent: Apr. 8, 2008

(54) VOLTAGE CONVERSION DEVICE AND COMPUTER-READABLE RECORDING MEDIUM HAVING PROGRAM RECORDED THEREON FOR COMPUTER TO CONTROL VOLTAGE CONVERSION

(75) Inventor: Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 168 days.

(21) Appl. No.: 10/560,087

(22) PCT Filed: May 25, 2004

(86) PCT No.: PCT/JP2004/007469

§ 371 (c)(1),
(2), (4) Date: Dec. 9, 2005

(87) PCT Pub. No.: WO2005/013471

PCT Pub. Date: Feb. 10, 2005

(65) Prior Publication Data

US 2006/0145677 A1 Jul. 6, 2006

(30) Foreign Application Priority Data

Jul. 31, 2003 (JP) ............................. 2003-204874

(51) Int. Cl.
H02M 7/5387 (2007.01)
(52) U.S. Cl. .................. 363/132; 363/98; 318/434; 318/801
(58) Field of Classification Search ............ 363/37–41, 363/131, 132, 127, 97, 98; 318/801–811, 318/430, 439, 599, 434
See application file for complete search history.

(56) References Cited

U.S. PATENT DOCUMENTS

| 4,630,187 | A | 12/1986 | Henze |
| 5,373,195 | A | 12/1994 | De Doncker et al. |
| 5,666,463 | A | 9/1997 | Schwartz et al. |
| 6,417,653 | B1 | 7/2002 | Massie et al. |
| 2003/0081440 | A1 * | 5/2003 | Komatsu et al. ............ 363/132 |
| 2004/0145338 | A1 | 7/2004 | Nakamura et al. |
| 2005/0067999 | A1 | 3/2005 | Okamura et al. |
| 2005/0254265 | A1 | 11/2005 | Yamada |

FOREIGN PATENT DOCUMENTS

| JP | A-07-288980 | 10/1995 |
| JP | A-11-089270 | 3/1999 |
| JP | A-2000-102290 | 4/2000 |
| JP | A-2001-037236 | 2/2001 |
| JP | A 2001-275367 | 10/2001 |
| JP | A-2003-309997 | 10/2003 |
| WO | WO03/056694 A1 | 10/2003 |

* cited by examiner

Primary Examiner—Rajnikant B. Patel
(74) Attorney, Agent, or Firm—Oliff & Berridge, PLC (57) ABSTRACT

In a case where the deviation between a target voltage (Vdc_com1) and an output voltage (Vm) is larger than a specified value (A), a voltage command (Vdc_com2) of a voltage step-up converter (12) is calculated by adding the specified value (A) to the output voltage (Vm). When the output voltage (Vm) having been decreasing starts to increase, the voltage command (Vdc_com2) is calculated in such a manner that the rate of change of the voltage command (Vdc_com2) is equal to or smaller than a standard value. Using the calculated voltage command (Vdc_com2), feedback control of the voltage step-up converter is conducted in such a manner that the output voltage (Vm) is equal to the target voltage (Vdc_com1).

9 Claims, 8 Drawing Sheets

VOLTAGE CONVERSION DEVICE AND COMPUTER-READABLE RECORDING MEDIUM HAVING PROGRAM RECORDED THEREON FOR COMPUTER TO CONTROL VOLTAGE CONVERSION

TECHNICAL FIELD

The present invention relates to a voltage conversion device converting a DC (direct current) voltage from a DC power supply into a target voltage and to a computer-readable recording medium having a program recorded thereon for a computer to control voltage conversion of a DC voltage into a target voltage.

BACKGROUND ART

Hybrid vehicles and electric vehicles have recently been of great interest as environment-friendly vehicles. The hybrid vehicles are now partially commercialized.

A hybrid vehicle has, as its motive power sources, a DC power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well. An electric vehicle refers to a vehicle that has, as its motive power sources, a DC power supply, an inverter and a motor driven by the inverter.

Regarding the hybrid or electric vehicle, it has been proposed to boost the DC voltage from the DC power supply with a voltage step-up converter and supply the boosted DC voltage to the inverter which drives the motor (Japanese Patent Laying-Open No. 2001-275367).

Specifically, the hybrid or electric vehicle has a motor drive apparatus mounted thereon that includes a bidirectional converter and an inverter. The bidirectional converter includes two IGBTs (Insulated Gate Bipolar Transistors) connected in series between a power supply line and a ground line of the inverter and a reactor L1 having one end connected to an intermediate point between the two IGBTs and the other end connected to the positive electrode of a battery.

The bidirectional converter boosts a DC voltage supplied from the battery in such a manner that an output voltage thereof is equal to a voltage command, and supplies the output voltage to the inverter. In a case where the DC voltage is to be raised to the output voltage by means of the bidirectional converter so that the output voltage is equal to the voltage command, a control unit conducts feedback control using a PI control gain. The inverter then drives the motor with the DC voltage supplied from the bidirectional converter.

As seen from the above, the conventional motor drive apparatus boosts the DC voltage from the battery to drive the motor with the boosted DC voltage.

The conventional motor drive apparatus, however, encounters a problem of overvoltage and overcurrent that could be generated when the feedback control is conducted for making the output voltage equal to the voltage command in such a case where the output voltage of the bidirectional converter varies due to a variation of a load applied to the motor.

Figure 10:
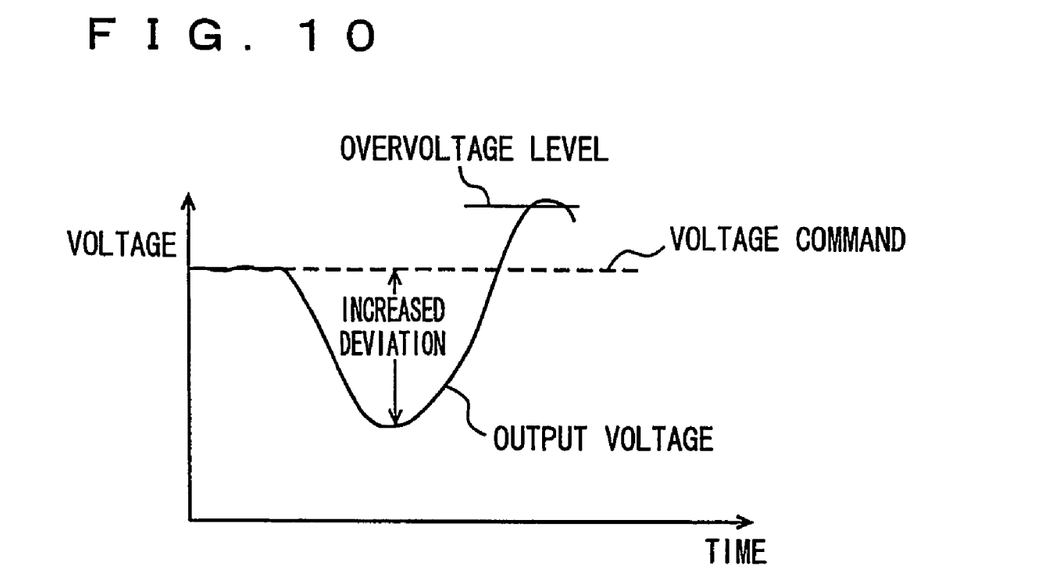
FIG. 10 is a voltage timing chart.

FIG. 10 is a voltage timing chart. Referring to FIG. 10, as the load applied to the motor increases, the output voltage of the bidirectional converter decreases below the voltage command, resulting in an increase in deviation between the voltage command and the output voltage.

In such a case, if a proportional gain and an integral gain determined according to the deviation are used to carry out the feedback control, the output voltage of the bidirectional converter exceeds the level of the overvoltage to cause the problem of generation of overvoltage and overcurrent. More specifically, since the proportional gain increases according to the deviation and the integral gain increases due to integration of the deviation, the output voltage of the bidirectional converter sharply increases to exceed the overvoltage level, resulting in generation of the overvoltage and overcurrent.

DISCLOSURE OF THE INVENTION

An object of the present invention is thus to provide a voltage conversion device converting a DC voltage into an output voltage in such a manner that the output voltage is equal to a voltage command while suppressing generation of overvoltage and overcurrent.

Another object of the present invention is to provide a computer-readable recording medium having a program recorded thereon for a computer to control voltage conversion from a DC voltage into an output voltage in such a manner that the output voltage is equal to a voltage command while suppressing generation of overvoltage and overcurrent.

According to the present invention, a voltage conversion device converting a DC voltage from a DC power supply into an output voltage in such a manner that the output voltage is equal to a target voltage includes a voltage converter, a detection unit and a control unit. The voltage converter changes a voltage level of the DC voltage to output the output voltage. The detection unit detects the output voltage output from the voltage converter. The control unit conducts feedback control of the voltage converter in the manner that the output voltage is equal to the target voltage, the feedback control conducted, in a case where a first deviation between the target voltage and the detected output voltage is larger than a predetermined value, by changing a voltage command of the voltage converter in such a manner that a second deviation between the voltage command and the output voltage decreases.

Preferably, the control unit controls the voltage converter, in a case where the detected output voltage decreases below the target voltage, so that the output voltage is equal to the target voltage by conducting first feedback control and second feedback control. The first feedback control refers to feedback control of the voltage converter executed by changing the voltage command in such a manner that the second deviation is at most the predetermined value. The second feedback control refers to feedback control of the voltage converter executed, in a case where the detected output voltage having been decreasing starts to increase, by changing the voltage command in such a manner that the rate of change of the voltage command is at most a standard value.

Preferably, in the case where the first deviation is larger than the predetermined value, the control unit conducts the first feedback control using the voltage command determined by adding the predetermined value to the detected output voltage.

Preferably, the output voltage is input to an inverter driving an AC motor.

Preferably, the AC motor is a motor for a vehicle.

Further, according to the present invention, with a computer-readable recording medium having a program recorded thereon for a computer to control voltage conversion from a DC voltage from a DC power supply into an output voltage in such a manner that the output voltage is equal to a target voltage, the computer executes: a first step of detecting the output voltage; and a second step of conducting feedback control of a voltage converter converting the DC voltage into the output voltage, the feedback control conducted, in a case where a first deviation between the target voltage and the detected output voltage is larger than a predetermined value, by changing a voltage command of the voltage converter in such a manner that a second deviation between the voltage command and the output voltage decreases.

Preferably, the second step includes: a first sub-step of calculating the first deviation; a second sub-step of detecting that the first deviation is larger than the predetermined value; a third sub-step of conducting feedback control of the voltage converter by changing the voltage command in such a manner that the second deviation is at most the predetermined value; and a fourth sub-step of conducting feedback control of the voltage converter, in a case where the detected output voltage having been decreasing starts to increase, by changing the voltage command in such a manner that the rate of change of the voltage command is at most a standard value.

Preferably, the third sub-step includes the steps of: calculating the voltage command by adding the predetermined value to the detected output voltage; and conducting feedback control of the voltage converter using the calculated voltage command.

Preferably, the fourth sub-step includes the steps of: detecting that the output voltage having been decreasing starts to increase; calculating a difference between a first voltage command at a first control timing and a second voltage command at a second control timing preceding the first control timing; comparing the difference with the standard value; calculating the first voltage command, in a case where the difference is larger than the standard value, by adding the standard value to the second voltage command; calculating the first voltage command, in a case where the difference is at most the standard value, by adding the predetermined value to the detected output voltage; and conducting feedback control of the voltage converter using the calculated first voltage command.

With the voltage conversion device of the present invention, the feedback control of the voltage converter is carried out, when the first deviation between the target voltage and the output voltage of the voltage converter is larger than the predetermined value, by changing the voltage command of the voltage converter. In other words, the feedback control is conducted by decreasing the deviation between the output voltage and the voltage command as well as the cumulative deviation therebetween as compared with the case where the voltage command of the voltage converter is fixed at the target voltage.

According to the present invention, generation of overvoltage and overcurrent can thus be suppressed in such a case where the feedback control is executed so that the output voltage is equal to the target voltage.

Further, with the voltage conversion device of the present invention, the feedback control is conducted, when the output voltage decreases below the target voltage and then starts to increase, by changing the voltage command so that the rate of change of the voltage command is equal to or smaller than the standard value.

According to the present invention, generation of overvoltage and overcurrent can thus be suppressed more reliably in the case where the feedback control is conducted in such a manner that the output voltage is equal to the target voltage.

BEST MODES FOR CARRYING OUT THE INVENTION

An embodiment of the present invention is hereinafter described in detail with reference to the drawings. Like components in the drawings are denoted by like reference characters and the description thereof is not repeated here.

Figure 1:
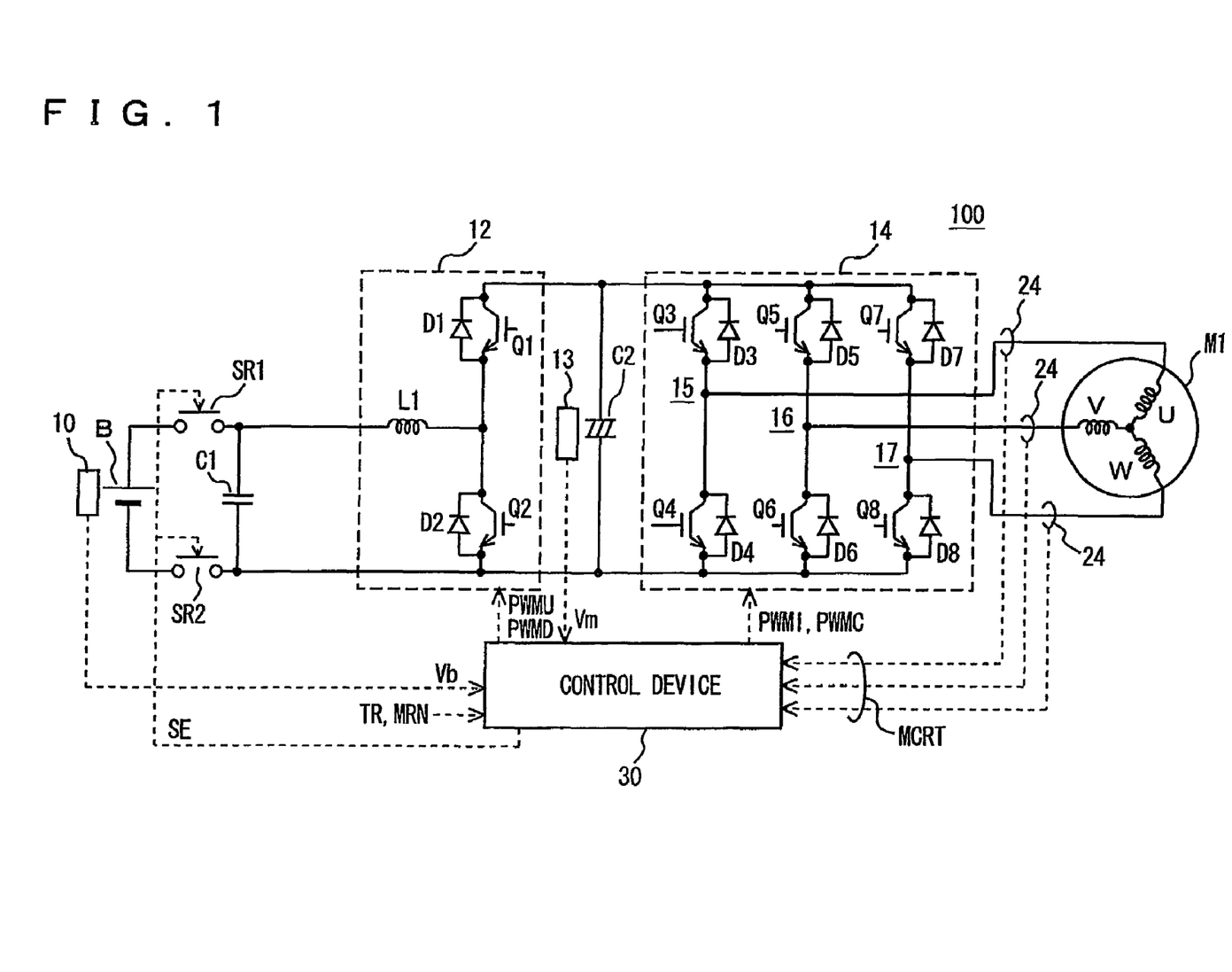
FIG. 1 is a schematic block diagram of a motor drive apparatus having a voltage conversion device according to an embodiment of the present invention.

Referring to FIG. 1, a motor drive apparatus 100 having a voltage conversion device according to this embodiment of the present invention includes a DC power supply B, voltage sensors 10 and 13, system relays SR1 and SR2, capacitors C1 and C2, a voltage step-up converter 12, an inverter 14, electric-current sensors 24, and a control device 30. An AC motor M1 is a drive motor generating torque for driving drive wheels of a hybrid vehicle or electric vehicle. Alternatively, the motor may be mounted on a hybrid vehicle to function as an electric generator driven by the engine as well as an electric motor for the engine and thus have the ability to start the engine for example.

Voltage step-up converter 12 includes a reactor L1, NPN transistors Q1 and Q2 and diodes D1 and D2. Reactor L1 has one end connected to a power supply line of DC power supply B and the other end connected to an intermediate point between NPN transistors Q1 and Q2, namely between the emitter of NPN transistor Q1 and the collector of NPN transistor Q2. NPN transistors Q1 and Q2 are connected in series between the power supply line and a ground line. The collector of NPN transistor Q1 is connected to the power supply line and the emitter of NPN transistor Q2 is connected to the ground line. Further, between respective collectors and emitters of NPN transistors Q1 and Q2, diodes D1 and D2 flowing current from respective emitters to respective collectors are provided.

Inverter 14 is comprised of a U phase arm 15, a V phase arm 16 and a W phase arm 17. U phase arm 15, V phase arm 16 and W phase arm 17 are provided in parallel between the power supply line and the ground line.

U phase arm 15 is comprised of series-connected NPN transistors Q3 and Q4, V phase arm 16 is comprised of series-connected NPN transistors Q5 and Q6 and W phase arm 17 is comprised of series-connected NPN transistors Q7 and Q8. Between respective collectors and emitters of NPN transistors Q3-Q8, diodes D3-D8 flowing current from respective emitters to respective collectors are connected.

An intermediate point of each phase arm is connected to an end of each phase coil of AC motor M1. Specifically, AC motor M1 is a three-phase permanent-magnet motor configured of three coils of U, V and W phases respectively. One end of the U phase coil, one end of the V phase coil and one end of the W phase coil are connected at the common central junction, while the other end of the U phase coil is connected to an intermediate point between NPN transistors Q3 and Q4, the other end of the V phase coil is connected to an intermediate point between NPN transistors Q5 and Q6 and the other end of the W phase coil is connected to an intermediate point between NPN transistors Q7 and Q8.

DC power supply B is comprised of secondary or rechargeable cell(s), for example, of nickel hydride or lithium ion. Voltage sensor 10 detects DC voltage Vb which is output from DC power supply B to output the detected DC voltage Vb to control device 30. System relays SR1 and SR2 are turned on/off in response to signal SE from control device 30.

Capacitor C1 smoothes the DC voltage Vb supplied from DC power supply B to provide the smoothed DC voltage to voltage step-up converter 12.

Voltage step-up converter 12 boosts the DC voltage from capacitor C1 to supply the boosted voltage to capacitor C2. More specifically, receiving signal PWMU from control device 30, voltage step-up converter 12 increases the DC voltage according to the period of time during which NPN transistor Q2 is turned on in response to signal PWMU, and supplies the increased voltage to capacitor C2. In this case, NPN transistor Q1 is turned off in response to signal PWMU. Further, receiving signal PWMD from control device 30, voltage step-up converter 12 decreases the DC voltage supplied from inverter 14 via capacitor C2 to charge DC power supply B.

Capacitor C2 smoothes the DC voltage from voltage step-up converter 12 to supply the smoothed DC voltage to inverter 14. Voltage sensor 13 detects the terminal-to-terminal voltage of capacitor C2, namely output voltage Vm of voltage step-up converter 12 (corresponding to the input voltage to inverter 14) to output the detected output voltage Vm to control device 30.

Receiving the DC voltage supplied from capacitor C2, inverter 14 converts the DC voltage into an AC voltage based on signal PWMI from control device 30 to drive AC motor M1. Accordingly, AC motor M1 is driven to generate torque indicated by torque command value TR. In a regenerative braking mode of the hybrid vehicle or electric vehicle having motor drive apparatus 100 mounted thereon, inverter 14 converts an AC voltage generated by AC motor M1 into a DC voltage based on signal PWMC from control device 30 to supply the resultant DC voltage to voltage step-up converter 12 via capacitor C2.

The regenerative braking here includes braking accompanied by regenerative power generation that is effected when a driver of the hybrid or electric vehicle steps on the foot brake as well as deceleration (or stop of acceleration) accompanied by regenerative power generation that is effected when the driver releases the accelerator pedal without operating the foot brake.

Current sensors 24 detect motor current MCRT flowing through AC motor M1 to output the detected motor current MCRT to control device 30.

Control device 30 generates signal PWMU for driving voltage step-up converter 12 and signal PWMI for driving inverter 14 based on torque command value TR and motor revolution number (number of revolutions of the motor) MRN that are input from an externally provided ECU (Electrical Control Unit), DC voltage Vb from voltage sensor 10, output voltage Vm from voltage sensor 13 and motor current MCRT from current sensors 24, according to a method hereinlater described, and outputs the generated signals PWMU and PWMI to voltage step-up converter 12 and inverter 14 respectively.

Signal PWMU is a signal for driving voltage step-up converter 12 to convert the DC voltage from capacitor C1 into output voltage Vm. When voltage step-up converter 12 converts the DC voltage into output voltage Vm, control device 30 conducts feedback control of output voltage Vm by generating signal PWMU for driving voltage step-up converter 12 in such a manner that output voltage Vm is equal to voltage command Vdc_com. A description of the method of generating signal PWMU is hereinlater given.

Further, receiving from the external ECU a signal indicating that the hybrid or electric vehicle enters the regenerative braking mode, control device 30 generates signal PWMC for converting the AC voltage generated by AC motor M1 into the DC voltage and outputs the generated signal to inverter 14. In this case, NPN transistors Q3-Q8 of inverter 14 are under switching control by signal PWMC. Inverter 14 thus converts the AC voltage generated by AC motor M1 into the DC voltage to supply the generated DC voltage to voltage step-up converter 12.

Moreover, receiving from the external ECU a signal indicating that the hybrid or electric vehicle enters the regenerative braking mode, control device 30 generates signal PWMD for decreasing the DC voltage supplied from inverter 14 to output the generated signal PWMD to voltage step-up converter 12. The AC voltage generated by AC motor M1 is thus converted into the DC voltage which is then decreased to be supplied to DC power supply B.

Moreover, control device 30 generates signal SE for turning on/off system relays SR1 and SR2 to output the generated signal to system relays SR1 and SR2.

Figure 2:
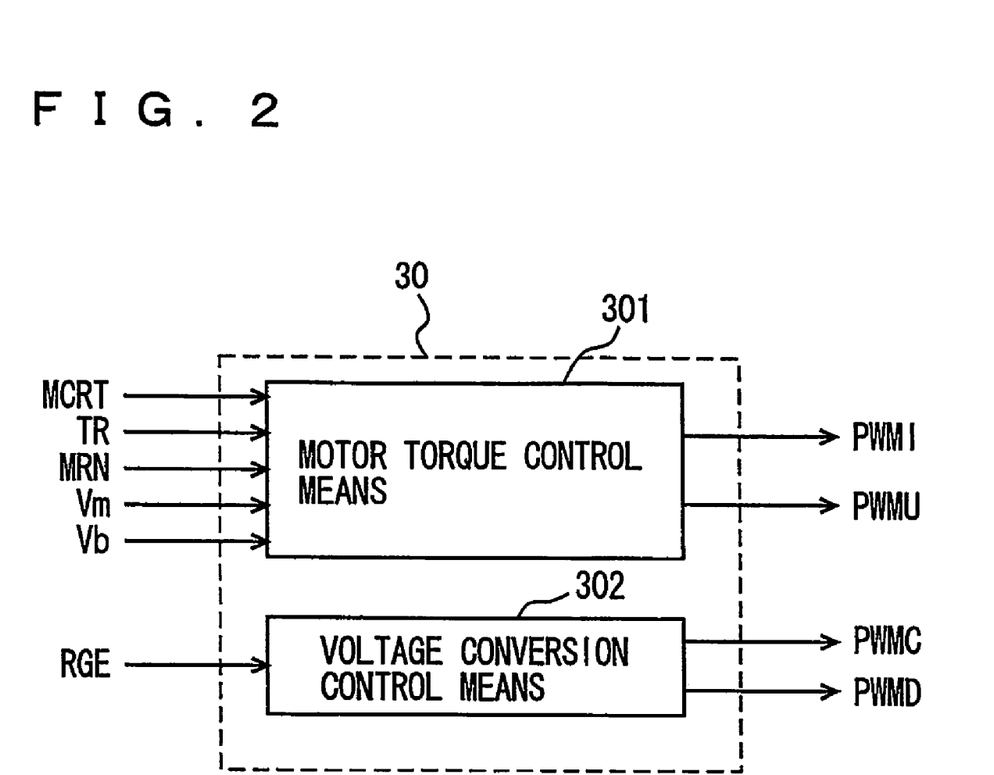
FIG. 2 is a functional block diagram of a control device shown in FIG. 1.

FIG. 2 is a functional block diagram of control device 30. Referring to FIG. 2, control device 30 includes motor torque control means 301 and voltage conversion control means 302. Motor torque control means 301 generates, when AC motor M1 is to be driven, signal PWMU for turning on/off NPN transistors Q1 and Q2 of voltage step-up converter 12 according to a method hereinlater described and signal PWMI for turning on/off NPN transistors Q3-Q8 of inverter 14, based on torque command value TR, DC voltage Vb from DC power supply B, motor current MCRT, motor revolution number MRN and output voltage Vm of voltage step-up converter 12, and outputs the generated signals PWMU and PWMI to voltage step-up converter 12 and inverter 14 respectively.

In the regenerative braking mode, receiving from the external ECU signal RGE indicating that the hybrid or electric vehicle enters the regenerative braking mode, voltage conversion control means 302 generates signal PWMC for converting the AC voltage generated by AC motor M1 into the DC voltage to output the generated signal to inverter 14.

In the regenerative braking mode, receiving signal RGE from the external ECU, voltage conversion control means 302 generates signal PWM for decreasing the DC voltage supplied from inverter 14 to output the generated signal to voltage step-up converter 12. It is seen from the fact that voltage step-up converter 12 can also decrease the voltage in response to signal PWMD for decreasing the DC voltage, voltage step-up converter 12 functions as the bidirectional converter.

Figure 3:
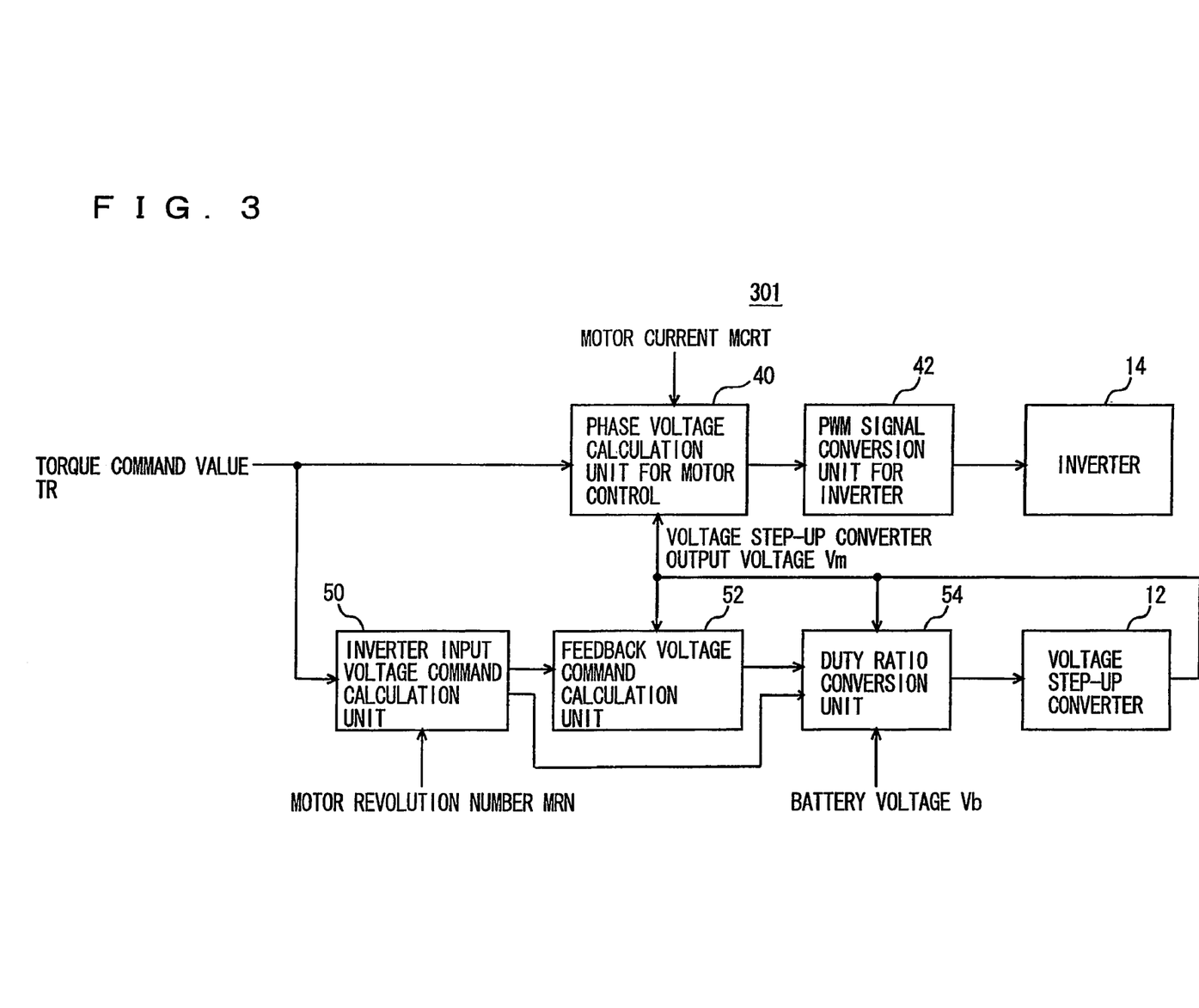
FIG. 3 is a functional block diagram of motor torque control means shown in FIG. 2.

FIG. 3 is a functional block diagram of motor torque control means 301. Referring to FIG. 3, motor torque control means 301 includes a phase voltage calculation unit 40 for motor control (hereinafter phase voltage calculation unit 40), a PWM signal conversion unit 42 for the inverter (hereinafter inverter PWM signal conversion unit 42), an inverter input voltage command calculation unit 50, a feedback voltage command calculation unit 52, and a duty ratio conversion unit 54.

Phase voltage calculation unit 40 receives from voltage sensor 13 output voltage Vm of voltage step-up converter 12, namely the input voltage to inverter 14, receives from current sensors 24 motor current MCRT flowing through respective phases of AC motor M1 and receives torque command value TR from the external ECU. Then, phase voltage calculation unit 40 calculates, based on these input signals, a voltage to be applied to each phase coil of AC motor M1 to provide the resultant voltage to inverter PWM signal conversion unit 42. Inverter PWM signal conversion unit 42 generates, based on the result of the calculation from phase voltage calculation unit 40, signal PWMI for actually turning on/off NPN transistors Q3-Q8 of inverter 14 and outputs the generated signal PWMI to NPN transistors Q3-Q8 each of inverter 14.

NPN transistors Q3-Q8 that are thus switching-controlled control the current to be flown to each phase of AC motor M1 so that AC motor M1 outputs the designated torque. In this way, the motor drive current is controlled and the motor torque is output according to torque command value TR.

Inverter input voltage command calculation unit 50 calculates, based on torque command value TR and motor revolution number MRN, an optimum value (target value) of the inverter input voltage, namely voltage command Vdc_com1 and outputs the resultant voltage command Vdc_com1 to feedback voltage command calculation unit 52.

Based on output voltage Vm of voltage step-up converter 12 from voltage sensor 13 and voltage command Vdc_com1 from inverter input voltage command calculation unit 50, feedback voltage command calculation unit 52 calculates feedback voltage command Vdc_com_fb according to a method hereinlater described and outputs the calculated feedback voltage command Vdc_com_fb to duty ratio conversion unit 54.

Based on DC voltage Vb from voltage sensor 10 and feedback voltage command Vdc_com_fb from feedback voltage command calculation unit 52, duty ratio conversion unit 54 calculates a duty ratio for setting output voltage Vm from voltage sensor 13 to feedback voltage command Vdc_com_fb, and generates, based on the calculated duty ratio, signal PWMU for turning on/off NPN transistors Q1 and Q2 of voltage step-up converter 12. Duty ratio conversion unit 54 then outputs the generated signal PWMU to NPN transistors Q1 and Q2 of voltage step-up converter 12.

The on-duty of NPN transistor Q2 which is the lower one included in voltage step-up converter 12 can be increased to increase electric-power storage of reactor L1, achieving a higher voltage output. In contrast, if the on-duty of the upper NPN transistor Q1 is increased, the voltage on the power supply line decreases. Accordingly, through control of the duty ratio of NPN transistors Q1 and Q2, the voltage on the power supply line can accordingly be controlled so that the voltage is set to an arbitrary voltage of at least the output voltage of DC power supply B.

Figure 4:
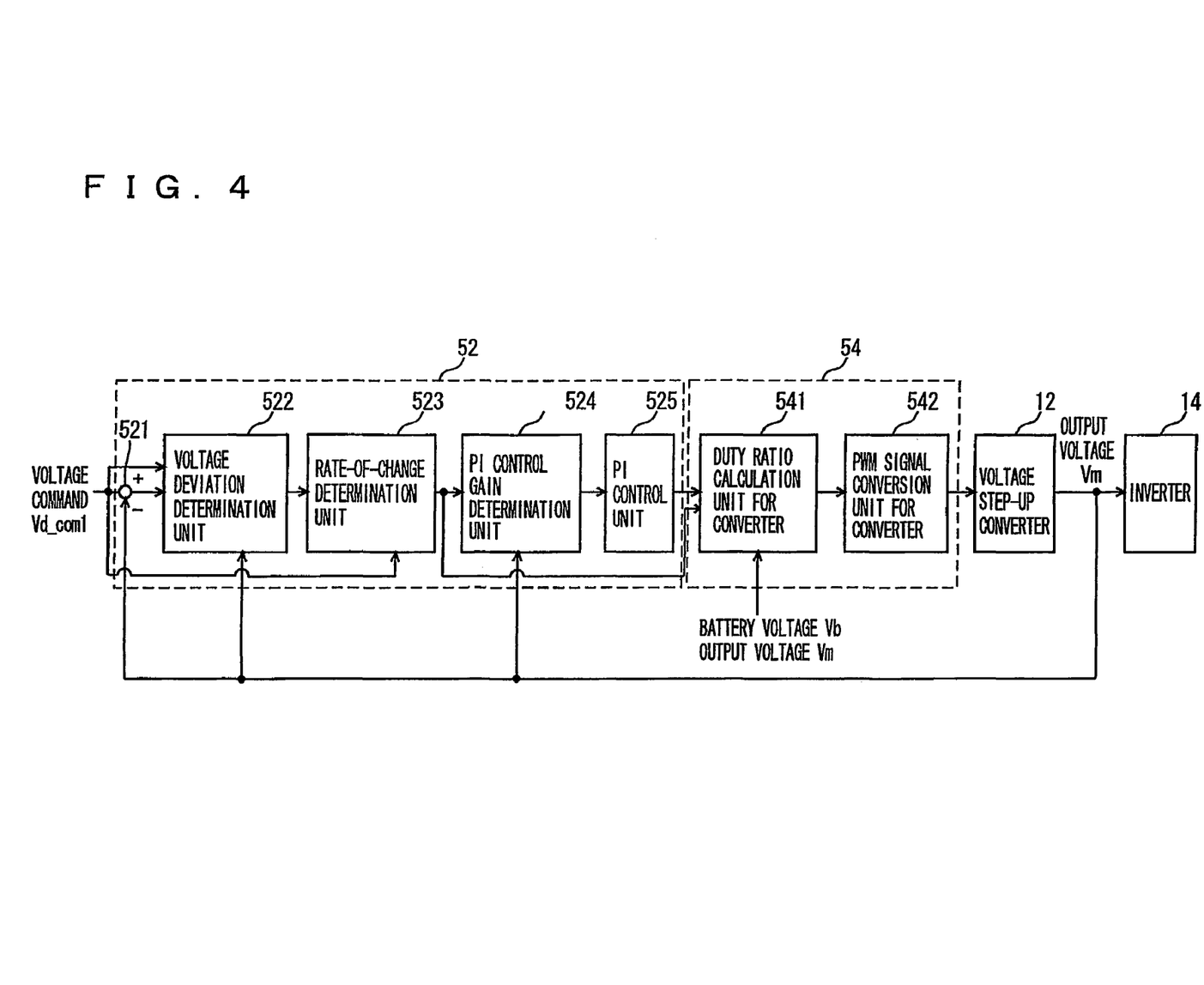
FIG. 4 is a functional block diagram of a feedback voltage command calculation unit and a duty ratio conversion unit shown in FIG. 3.

FIG. 4 is a functional block diagram of feedback voltage command calculation unit 52 and duty ratio conversion unit 54 shown in FIG. 3. Referring to FIG. 4, feedback voltage command calculation unit 52 includes a subtracter 521, a voltage deviation determination unit 522, a rate-of-change determination unit 523, a PI control gain determination unit 524 and a PI control unit 525.

Subtracter 521 receives voltage command Vdc_com1 from inverter input voltage command calculation unit 50 as well as output voltage Vm from voltage sensor 13 and subtracts output voltage Vm from voltage command Vdc_com1. Subtracter 521 then outputs the result of subtraction represented by deviation ΔVdc1 to voltage deviation determination unit 522.

Voltage deviation determination unit 522 determines whether or not deviation ΔVdc1 from subtracter 521 is larger than a specified value A. If deviation ΔVdc1 is larger than specified value A, voltage deviation determination unit 522 adds specified value A to output voltage Vm from voltage sensor 13 and outputs the result, namely voltage Vm+A, as new voltage command Vdc_com2, to rate-of-change determination unit 523. If deviation ΔVdc1 is equal to or smaller than specified value A, voltage deviation determination unit 522 outputs to rate-of-change determination unit 523 voltage command Vdc_com1 from inverter input voltage command calculation unit 50.

Rate-of-change determination unit 523 determines whether or not voltage command Vdc_com2 from voltage deviation determination unit 522 increases. More specifically, rate-of-change determination unit 523 stores voltage command Vdc_com2 (n−1) under the preceding control and calculates the difference between voltage command Vdc_com2 (n) under the current control and voltage command Vdc_com2 (n−1) under the preceding control to determine whether or not voltage command Vdc_com2 increases.

Then, if voltage command Vdc_com2 does not increase, rate-of-change determination unit 523 uses voltage command Vdc_com2 (n) (=Vm+A) from voltage deviation determination unit 522 as it is.

If voltage command Vdc_com2 increases, rate-of-change determination unit 523 calculates difference ΔVdc_com between voltage command Vdc_com2 (n) under the current control and voltage command Vdc_com2 (n−1) under the preceding control and compares the calculated difference ΔVdc_com with a standard value STD.

If difference ΔVdc_com is larger than standard value STD, rate-of-change determination unit 523 determines voltage command Vdc_com2 (n) under the current control by calculating Vdc_com (n−1)+STD.

If difference ΔVdc_com is equal to or smaller than standard value STD, rate-of-change determination unit 523 uses voltage command Vdc_com2 (n) (=Vm+A) from voltage deviation determination unit 522 as it is.

Then, rate-of-change determination unit 523 compares voltage command Vdc_com2 (n) with voltage command Vdc_com1 (target voltage) received from inverter input voltage command calculation unit 50. If voltage command Vdc_com2 (n) is equal to or larger than voltage command Vdc_com1, rate-of-change determination unit 523 outputs this target voltage Vdc_com1 to PI control gain determination unit 524. If voltage command Vdc_com2 (n) is smaller than voltage command Vdc_com1, rate-of-change determination unit 523 outputs voltage command Vdc_com2 (n) to PI control gain determination unit 524.

PI control gain determination unit 524 calculates deviation ΔVdc2 between voltage command Vdc_com1 or voltage command Vdc_com2 (n) from rate-of-change determination unit 523 and output voltage Vm from voltage sensor 13 to output this calculated deviation ΔVdc2, proportional gain PG and integral gain IG to PI control unit 525.

PI control unit 525 calculates feedback voltage command Vdc_com_fb based on proportional gain PG, integral gain IG and deviation ΔVdc2. Specifically, PI control unit 525 substitutes proportional gain PG, integral gain IG and deviation ΔVdc2 from PI control gain determination unit 524 into the following expression to determine feedback voltage command Vdc_com_fb.

$$Vdc\_com\_fb = PG \times \Delta Vdc2 + IG \times \Sigma \Delta Vdc2 \qquad (1)$$

PI control unit 525 then outputs the calculated feedback voltage command Vdc_com_fb to duty ratio conversion unit 54.

Duty ratio conversion unit 54 includes a duty ratio calculation unit 541 for the converter and a PWM signal conversion unit 542 for the converter. Based on DC voltage Vb from voltage sensor 10 and feedback voltage command Vdc_com_fb from PI control unit 525, converter duty ratio calculation unit 541 calculates a duty ratio for setting output voltage Vm from voltage sensor 13 to feedback voltage command Vdc_com_fb.

Based on the duty ratio from converter duty ratio calculation unit 541, converter PWM signal conversion unit 542 generates signal PWMU for turning on/off NPN transistors Q1 and Q2 of voltage step-up converter 12. Then, converter PWM signal conversion unit 542 outputs the generated signal PWMU to NPN transistors Q1 and Q2 of voltage step-up converter 12.

Accordingly, NPN transistors Q1 and Q2 of voltage step-up converter 12 are turned on/off based on signal PWMU. Voltage step-up converter 12 thus converts the DC voltage into output voltage Vm in such a manner that output voltage Vm is equal to voltage command Vdc_com1.

Figure 5:
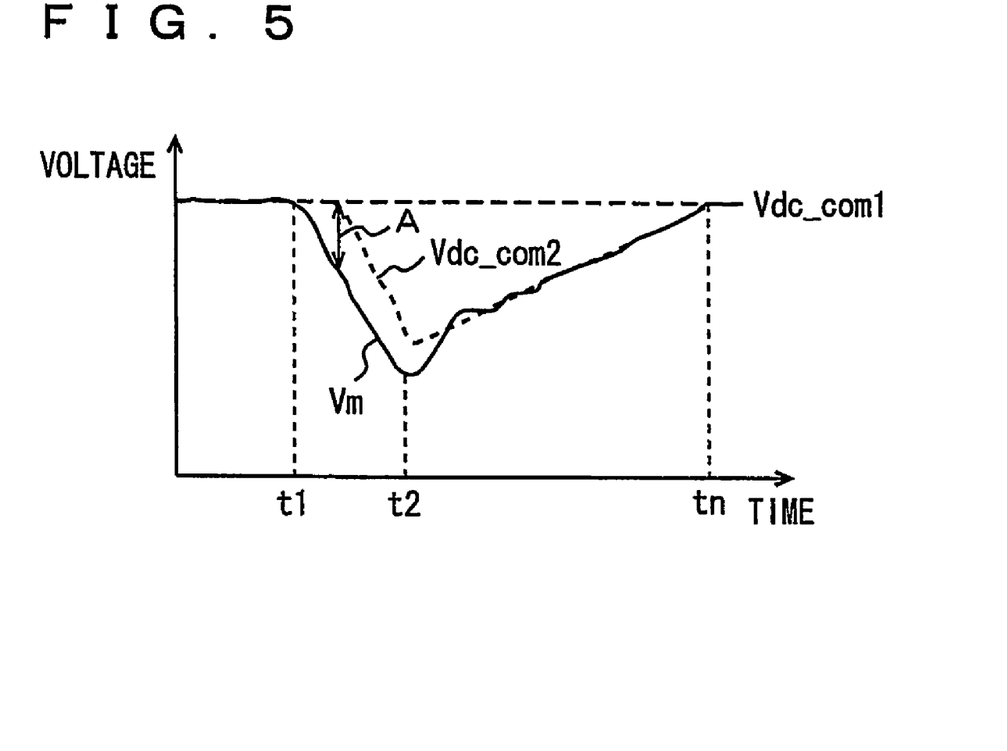
FIG. 5 is a voltage timing chart.

FIG. 5 is a voltage timing chart. Referring to FIG. 5, a description is given below of feedback control of voltage step-up converter 12 converting DC voltage Vb into output voltage Vm in such a manner that output voltage Vm is equal to voltage command Vdc_com1.

As load of AC motor M1 increases, output voltage Vm of voltage step-up converter 12 starts to decrease at timing t1. It is then determined whether deviation ΔVdc1 between voltage command Vdc_com1 and output voltage Vm is larger than specified value A. If deviation ΔVdc1 is larger than specified value A, new voltage command Vdc_com2 is determined by adding specified value A to output voltage Vm (Vdc_com2=Vm+A).

In this case, voltage command Vdc_com1 is the target voltage that voltage step-up converter 12 should output while voltage command Vdc_com2 is a pseudo voltage command for preventing overvoltage and overcurrent from being generated due to output voltage Vm exceeding voltage command Vdc_com1 (=target voltage) when feedback control is conducted for making output voltage Vm equal to voltage command Vdc_com1 (=target voltage).

Therefore, while voltage command Vdc_com1 is fixed once it is output from inverter input voltage command calculation unit 50, voltage command Vdc_com2 is varied depending on the timing of control according to the variation of output voltage Vm.

In the period from timing t1 to timing t2 in which output voltage Vm continues to decrease, deviation ΔVdc1 between voltage command Vdc_com1 (=target voltage) and output voltage Vm is larger than specified value A. Then, specified value A is added to output voltage Vm to calculate voltage command Vdc_com2 (=Vm+A) and feedback control is done using this voltage command Vdc_com2.

At timing t2, voltage command Vdc_com2 that has been decreasing starts to increase. Then, voltage command Vdc_com2 is determined in such a manner that the rate of change ΔVdc_com of voltage command Vdc_com2 which is calculated by adding specified value A to output voltage Vm is equal to or smaller than standard value STD.

Since deviation ΔVdc1 between voltage command Vdc_com1 and output voltage Vm is still larger than specified value A at timing t2, voltage command Vdc_com2 is basically calculated by adding specified value A to output voltage Vm. In the region where output voltage Vm increases, however, if feedback control is done using voltage command Vdc_com2 calculated by adding specified value A to output voltage Vm, output voltage Vm could exceed voltage command Vdc_com1 (=target voltage) to reach an overvoltage level, resulting in generation of overvoltage and overcurrent.

Then, when output voltage Vm having been decreasing starts to increase, the new voltage command Vdc_com2 is set in such a manner that the rate of change is equal to or smaller than standard value STD.

More specifically, difference ΔVdc_com between voltage command Vdc_com2 (n) under the current control and voltage command Vdc_com2 (n−1) under the preceding control is calculated, and the calculated difference ΔVdc_com is compared with standard value STD.

If difference ΔVdc_com is larger than standard value STD, voltage command Vdc_com2 (n) under the current control is calculated following the equation Vdc_com2 (2)=Vdc_com2 (n−1)+STD.

If difference ΔVdc_com is equal to or smaller than standard value STD, voltage command Vdc_com2 (n) (=Vm+A) that is calculated by adding specified value A to output voltage Vm is used as it is.

Once voltage command Vdc_com2 is determined in this way, it is determined whether voltage command Vdc_com2 is equal to or larger than voltage command Vdc_com1. If voltage command Vdc_com2 is equal to or larger than voltage command Vdc_com1, feedback control is done using voltage command Vdc_com1. If voltage command Vdc_com2 is smaller than voltage command Vdc_com1, feedback control is done using voltage command Vdc_com2.

For the region where output voltage Vm continues to decrease, voltage command Vdc_com2 is calculated by adding specified value A to output voltage Vm and feedback control is done using the calculated voltage command Vdc_com2. In other words, for the region where output voltage Vm continues to decrease, feedback control is done by changing voltage command Vdc_com2 in such a manner that deviation ΔVdc2 between voltage command Vdc_com2 and output voltage Vm is equal to or smaller than specified value A.

Then, when output voltage Vm having been decreasing starts to increase, feedback control is done by changing voltage command Vdc_com2 in such a manner that the rate of change ΔVdc_com is equal to or smaller than standard value STD. In this way, output voltage Vm is made equal to target voltage Vdc_com1 at timing tn without reaching the overvoltage level.

In this case, standard value STD is set to any value that does not cause overcurrent to flow to AC motor M1 which is a load and to DC power supply B and does not cause overvoltage to be generated. In other words, when the input voltage to the load sharply increases, there is a higher possibility that overcurrent flows to the load. When the overcurrent flows to the load, electric power from DC power supply B also increases suddenly so that overcurrent also flows to DC power supply B. It is also possible that overvoltage is generated. Standard value STD is thus set to a value that does not cause the overcurrent and the overvoltage to be generated.

With reference to FIG. 5, after timing t2, voltage command Vdc_com2 is calculated in such a manner that the rate of change is equal to or smaller than standard value STD, and thus output voltage Vm becomes equal to voltage command Vdc_com2 at any time in the period from timing t2 to timing tn. It is seen from this that the feedback control of the present invention is conducted to change voltage command Vdc_com2 in such a manner that deviation ΔVdc2 between voltage command Vdc_com2 and output voltage Vm decreases in such a case where output voltage Vm decreases to become considerably smaller than target voltage Vdc_com1 as deviation ΔVdc1 becomes larger than specified value A.

The event that output voltage Vm decreases to become considerably smaller than target voltage Vdc_com1 as shown in FIG. 5 could occur in the following two cases where:

(A) the output of AC motor M1 which is the load suddenly increases so that the output of DC power supply B cannot respond to the sudden increase; and (B) the output of AC motor M1 which is the load exceeds a maximum output of DC power supply B.

Case (A) occurs in a case where the load is an AC motor coupled to drive wheels of the vehicle and the drive wheels suddenly slip, while case (B) occurs in a case where the ambient temperature decreases resulting in deterioration in output characteristics of DC power supply B.

Figure 6:
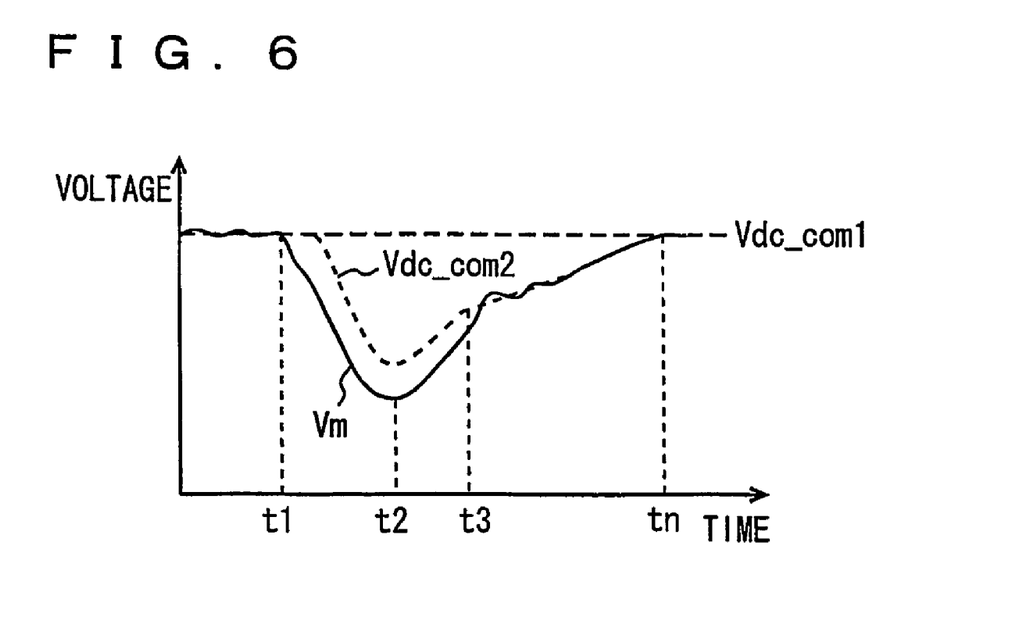
FIG. 6 is another voltage timing chart.

FIG. 6 is another voltage timing chart. Referring to FIG. 6, in the period from timing t1 to timing t3, voltage command Vdc_com2 is calculated by adding specified value A to output voltage Vm. In other words, even after output voltage Vm having been decreasing starts to increase, voltage command Vdc_com2 is calculated by adding specified value A to output voltage Vm.

Then, at and after timing t3, voltage command Vdc_com2 is determined in such a manner that the rate of change is equal to or smaller than standard value STD.

As seen from the above, the timing from which voltage command Vdc_com2 is determined in such a manner that the rate of change is equal to or smaller than standard value STD may not be simultaneous with the timing at which output voltage Vm having been decreasing starts to increase, and may be any timing after output voltage Vm having been decreasing starts to increase.

Figure 7:
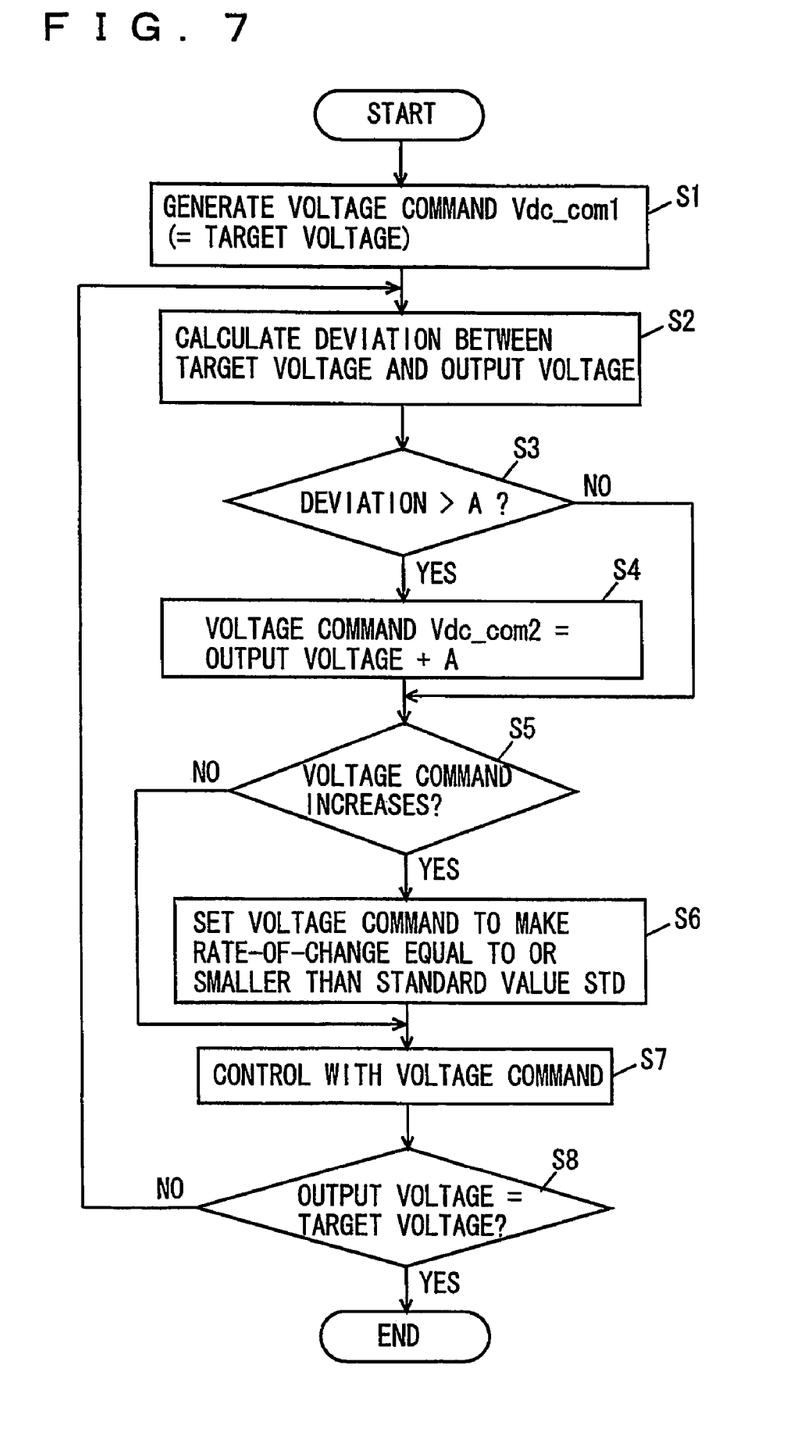
FIG. 7 is a flowchart illustrating operations of feedback control applied when a voltage step-up converter converts a DC voltage into an output voltage in such a manner that the output voltage is equal to a voltage command.

FIG. 7 is a flowchart illustrating operations of feedback control under which voltage step-up converter 12 converts DC voltage Vb into output voltage Vm in such a manner that output voltage Vm is equal to voltage command Vdc_com1.

Referring to FIG. 7, on the start of a series of operations, inverter input voltage command calculation unit 50 generates voltage command Vdc_com1 (=target voltage) based on torque command value TR and motor revolution number MRN from the external ECU (step S1) to output the generated voltage command Vdc_com1 to feedback voltage command calculation unit 52.

Subtracter 521 of feedback voltage command calculation unit 52 calculates deviation ΔVdc1 between target voltage Vdc_com1 and output voltage Vm (step S2) to output the calculated deviation ΔVdc1 to voltage deviation determination unit 522.

Then, voltage deviation determination unit 522 determines whether or not deviation ΔVdc1 is larger than specified value A (step S3). When deviation ΔVdc1 is larger than specified value A, voltage deviation determination unit 522 calculates voltage command Vdc_com2 by adding specified value A to output voltage Vm to output the resultant voltage command to rate-of-change determination unit 523 (step S4).

In step S3, when voltage deviation determination unit 522 determines that deviation ΔVdc1 is equal to or smaller than specified value A, voltage deviation determination unit 522 outputs voltage command Vdc_com1 provided from inverter input voltage command calculation unit 50 to rate-of-change determination unit 523.

After the determination of "No" in step S3 or after step S4, rate-of-change determination unit 523 determines whether or not voltage command Vdc_com2 from voltage deviation determination unit 522 increases (step S5). When voltage command Vdc_com2 does not increase, the series of operations proceed to step S7.

In step S5, when it is determined that voltage command Vdc_com2 increases, voltage command Vdc_com2 is set in such a manner that the rate of change in voltage command Vdc_com2 is equal to or smaller than standard value STD (step S6).

After the determination of "No" in step S5 or after step S6, PI control gain determination unit 524 calculates deviation ΔVdc2 between voltage command Vdc_com2 from rate-of-change determination unit 523 and output voltage Vm to output the calculated deviation ΔVdc2, proportional gain PG and integral gain IG to PI control unit 525.

PI control unit 525 substitutes deviation ΔVdc2, proportional gain PG and integral gain IG provided from PI control gain determination unit 524 into expression (1) to calculate feedback voltage command Vdc_com_fb. Then, PI control unit 525 outputs the calculated feedback voltage command Vdc_com_fb to duty ratio conversion unit 54.

Duty ratio conversion unit 54 calculates, based on feedback voltage command Vdc_com_fb from PI control unit 525, DC voltage Vb from voltage sensor 10 and output voltage Vm from voltage sensor 13, the duty ratio for setting output voltage Vm to feedback voltage command Vdc_com_fb to generate, based on the calculated duty ratio, signal PWMU for turning on/off NPN transistors Q1 and Q2 of voltage step-up converter 12. Then, duty ratio conversion unit 54 outputs the generated signal PWMU to NPN transistors Q1 and Q2 of voltage step-up converter 12. Control by means of voltage command Vdc_com2 is thus carried out (step S7).

After this, it is determined whether or not output voltage Vm is equal to target voltage Vdc_com1 (step S8). When output voltage Vm is not equal to target voltage Vdc_com1, steps S2-S8 are repeated. Then, when output voltage Vm becomes equal to target voltage Vdc_com1, the series of operations are ended.

Figure 8:
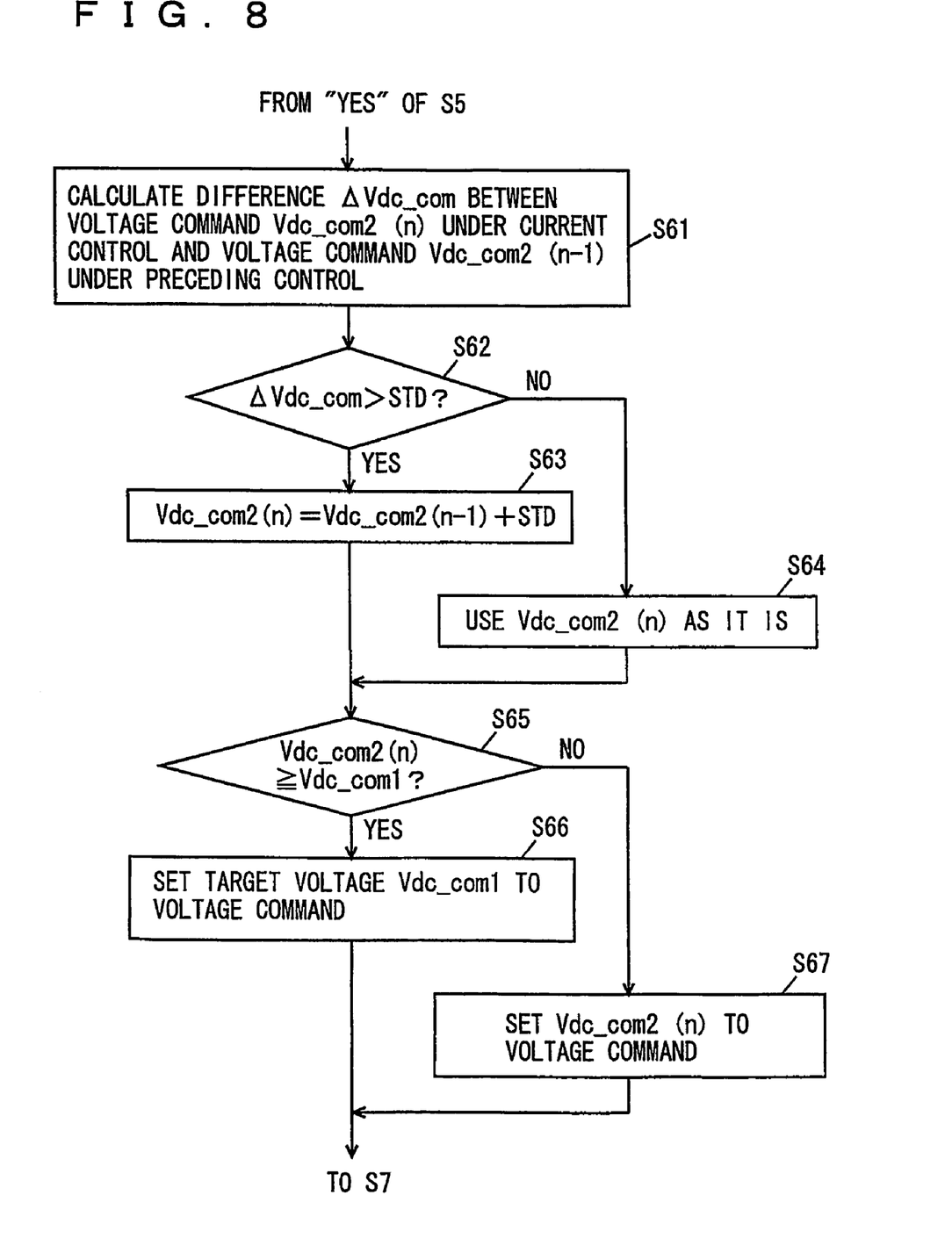
FIG. 8 is a flowchart illustrating in detail the operation in step S6 shown in FIG. 7.

FIG. 8 is a flowchart illustrating in detail the operation in step S6 shown in FIG. 7. When it is determined in step S5 shown in FIG. 7 that voltage command Vdc_com2 increases, rate-of-change determination unit 523 calculates difference ΔVdc_com between voltage command Vdc_com2 (n) under the current control and voltage command Vdc_com2 (n−1) under the preceding control (step S61) and determines whether or not the calculated difference ΔVdc_com is larger than standard value STD (step S62).

When difference ΔVdc_com is larger than standard value STD, rate-of-change determination unit 523 calculates voltage command Vdc_com2 (n) under the current control by adding standard value STD to voltage command Vdc_com2 (n−1) under the preceding control (step S63).

When it is determined in step S62 that difference ΔVdc_com is equal to or smaller than standard value STD, voltage command Vdc_com2 (n) under the current control, namely voltage command Vdc_com2 (n) which is calculated by adding specified value A to output voltage Vm by voltage deviation determination unit 522 is used (step S64).

After step S63 or step S64, rate-of-change determination unit 523 determines whether or not voltage command Vdc_com2 (n) calculated in step S63 or S64 is equal to or larger than target voltage Vdc_com1 (step S65). When voltage command Vdc_com2 (n) is equal to or larger than target voltage Vdc_com1, rate-of-change determination unit 523 outputs target voltage Vdc_com1 as a voltage command to PI control gain determination unit 524 (step S66).

When voltage command Vdc_com2 (n) is smaller than target voltage Vdc_com1, rate-of-change determination unit 523 outputs voltage command Vdc_com2 (n) as a voltage command to PI control gain determination unit 524 (step S67).

After step S66 or step S67, the series of operations proceed to step S7 shown in FIG. 7.

In the above-described flowchart, the procedure through which step S2, "Yes" in step S3, step S4, "No" in step S5, step S7 and "No" in step S8 are repeated corresponds to a procedure through which feedback control is carried out, in the case where output voltage Vm continues to decrease, by calculating voltage command Vdc_com2 through addition of specified value A to output voltage Vm and changing voltage command Vdc_com2 in such a manner that the deviation between voltage command Vdc_com2 and output voltage Vm is equal to or smaller than specified value A in the period from timing t1 to timing t2 shown in FIG. 5.

In the above-described flowchart, the procedure through which step S2, "Yes" in step S3, step S4, "Yes" in step S5, step S6, step S7 and "No" in step S8 are repeated corresponds to a procedure through which feedback control is carried out, in the case where output voltage Vm having been decreasing starts to increase, by calculating voltage command Vdc_com2 in such a manner that the rate of change is equal to or smaller than standard value STD, specifically, by changing voltage command Vdc_com2 in such a manner that the rate of change is equal to or smaller than standard value STD at and after timing t2 shown in FIG. 5.

As seen from the above, by the procedure through which step S2, "Yes" in step S3, step S4, "No" in step S5, step S7 and "No" in step S8 are repeated, the feedback control is conducted by decreasing voltage command Vdc_com2 as output voltage Vm decreases and, by the procedure through which step S2, "Yes" in step S3, step S4, "Yes" in step S5, step S6, step S7 and "No" in step S8 are repeated, the feedback control is conducted by limiting the rate of change to standard value STD or smaller. Thus, the feedback control for making output voltage Vm equal to target voltage Vdc_com1 corresponds to feedback control under which the rate of change of voltage command Vdc_com2 is changed according to the rate of change of output voltage Vm.

Further, the operation in step S5 of determining that voltage command Vdc_com2 increases corresponds to an operation of determining that output voltage Vm which has been decreasing starts to increase.

As discussed above, a feature of the present invention is that the feedback control of voltage step-up converter 12 is conducted, in such a case where output voltage Vm becomes smaller than target voltage Vdc_com1 as deviation ΔVdc1 between output voltage Vm and target voltage Vdc_com1 is larger than a specified value, by changing voltage command Vdc_com2 so that deviation ΔVdc2 between voltage command Vdc_com2 and output voltage Vm decreases.

Specifically, voltage command Vdc_com2 is changed for allowing deviation ΔVdc2 with respect to output voltage Vm to decrease by changing voltage command Vdc_com2 in such a manner that deviation ΔVdc2 with respect to output voltage Vm is equal to or smaller than specified value A in the case where output voltage Vm continues to decrease and by changing voltage command Vdc_com2 in such a manner that the rate of change is equal to or smaller than standard value STD in the case where output voltage Vm having been decreasing starts to increase.

With the above-described feature, the deviation between the voltage command and output voltage Vm as well as a cumulative deviation resultant from accumulation of the deviation can be reduced as compared with the case where the voltage command of voltage step-up converter 12 is fixed at target voltage Vdc_com1. Consequently, when the feedback control is done in such a manner that output voltage Vm is equal to target voltage Vdc_com1, generation of overvoltage and overcurrent can be suppressed that results from output voltage Vm exceeding target voltage Vdc_com1 to reach an overvoltage level.

The above-described specified value A is set to a value which completely eliminates delay in response of output voltage Vm. According to the description above, in the case where deviation ΔVdc1 between target voltage Vdc_com1 and output voltage Vm is larger than specified value A, voltage command Vdc_com2 is calculated by simply adding specified value A to output voltage Vm. The present invention, however, is not limited to this calculation. Alternatively, voltage command Vdc_com2 may be calculated by adding a value A±α to output voltage Vm so that the delay in response of output voltage Vm is substantially eliminated.

Figure 9:
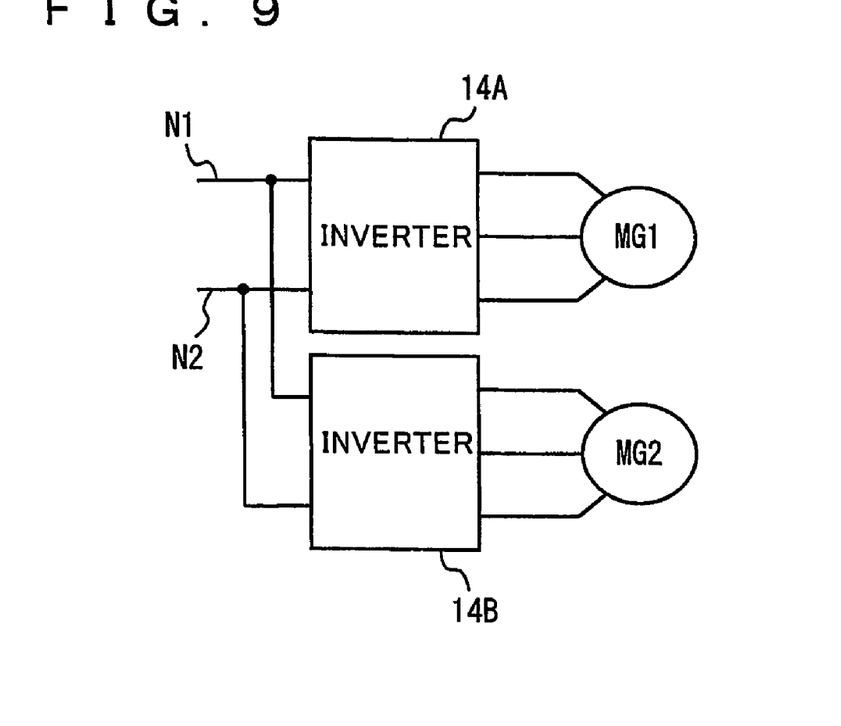
FIG. 9 is a block diagram of two motor generators and two inverters.

Motor drive apparatus 100 is mounted for example on a hybrid vehicle. In this case, AC motor M1 is comprised of two motor generators MG1 and MG2 and inverter 14 is comprised of two inverters. Specifically, as shown in FIG. 9, two inverters 14A and 14B are provided correspondingly to two motor generators MG1 and MG2. These two inverters 14A and 14B are connected in parallel to nodes N1 and N2 connected to respective ends of capacitor C2.

Motor generator MG1 is coupled via a power split device (not shown) to the engine while motor generator MG2 is coupled via the power split device to drive wheels.

Inverter 14A converts a DC voltage from voltage step-up converter 12 into an AC voltage to drive motor generator MG1 and converts an AC voltage generated by motor generator MG1 from rotational force of the engine into a DC voltage to supply the generated voltage to voltage step-up converter 12.

Inverter 14B converts the DC voltage from voltage step-up converter 12 into an AC voltage to drive motor generator MG2 and converts an AC voltage generated by motor generator MG2 from rotational force of the drive wheels into a DC voltage to supply the generated voltage to voltage step-up converter 12.

Output voltage Vm of voltage step-up converter 12 decreases to be considerably smaller than target voltage Vdc_com1 in such a case where motor generators MG1 and MG2 are driven in the electric motor mode, namely, in the case where the engine is started by motor generator MG1 when the vehicle is run as an electric vehicle (EV drive) by rotating the drive wheels with output torque of motor generator MG2.

In the above-described case, even if output voltage Vm decreases to be far smaller than target voltage Vdc_com1, the feedback control can suppress generation of overcurrent and overvoltage as described above while DC voltage Vb is increased to output voltage Vm so that output voltage Vm is equal to target voltage Vdc_com1.

The present invention is therefore particularly effective for the feedback control of the voltage step-up converter mounted on the hybrid vehicle.

While the description above is applied to the case where output voltage Vm of voltage step-up converter 12 decreases from target voltage Vdc_com1, the present invention may alternatively be applied to a case where output voltage Vm increases from target voltage Vdc_com1.

According to the description above, duty ratio conversion unit 54 uses feedback voltage command Vdc_com_fb from feedback voltage command calculation unit 52 to calculate the duty ratio for setting output voltage Vm from voltage sensor 13 to feedback voltage command Vdc_com_fb. The present invention, however, is not limited to this and duty ratio conversion unit 54 may calculate the duty ratio by correcting voltage command Vdc_com1 from inverter input voltage command calculation unit 50 with feedback voltage command Vdc_com_fb from feedback voltage command calculation unit 52 to calculate the duty ratio for setting output voltage Vm to the corrected voltage command Vdc_com1.

In this case, as shown in FIG. 3, inverter input voltage command calculation unit 50 outputs calculated voltage command Vdc_com1 to feedback voltage command calculation unit 52 and duty ratio conversion unit 54.

Moreover, according to the description above, converter duty ratio calculation unit 541 calculates the duty ratio for setting output voltage Vm from voltage sensor 13 to feedback voltage command Vdc_com_fb using feedback voltage command Vdc_com_fb from PI control unit 525. The present invention, however, is not limited to this. Alternatively, according to the present invention, converter duty ratio calculation unit 541 may calculate the duty ratio by correcting voltage command Vdc_com2 from rate-of-change determination unit 523 using feedback voltage command Vdc_com_fb from PI control unit 525 and then setting output voltage Vm to the corrected voltage command Vdc_com1.

In this case, as shown in FIG. 4, rate-of-change determination unit 523 outputs the finally determined voltage command Vdc_com2 to PI control gain determination unit 524 and converter duty ratio calculation unit 541.

Further, according to the description above, control device 30 receives signal RGE from the external ECU in the regenerative mode, and control device 30 generates signals PWMU and PWMD for controlling voltage step-up converter 12 and signals PWMI and PWMC for controlling inverter 14. The present invention, however, is not limited to this and control device 30 may generate a PWM signal for controlling voltage step-up converter 12 and inverter 14 with the PI control so that the output voltage follows voltage command Vdc_com1.

Moreover, according to the present invention, "voltage conversion device" is comprised of voltage step-up converter 12, feedback voltage command calculation unit 52 and duty ratio conversion unit 54 of control device 30.

Further, according to the present invention, "control means" for controlling voltage step-up converter 12 serving as a voltage converter is comprised of feedback voltage command calculation unit 52 and duty ratio conversion unit 54.

The feedback control by feedback voltage command calculation unit 52 and duty ratio conversion unit 54 is actually conducted by a CPU (Central Processing Unit). The CPU reads from a ROM (Read Only Memory) a program having the steps of the flowcharts shown in FIGS. 7 and 8 to execute the read program for controlling the voltage conversion from the DC voltage into output voltage Vm following the flowcharts shown in FIGS. 7 and 8. The ROM thus corresponds to a computer (CPU)-readable recording medium having the program recorded thereon that has the steps of the flowcharts in FIGS. 7 and 8.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to a voltage conversion device converting a DC voltage into an output voltage in such a manner that the output voltage is equal to a voltage command while suppressing generation of overvoltage and overcurrent. Further, the present invention is applied to a computer-readable recording medium having a program recorded thereon for a computer to execute control of voltage conversion from a DC voltage into an output voltage in such a manner that the output voltage is equal to a voltage command.

The invention claimed is:

1. A voltage conversion device converting a DC voltage from a DC power supply into an output voltage in such a manner that said output voltage is equal to a first target voltage, comprising:

a voltage converter changing a voltage level of said DC voltage to output said output voltage;

detection means detecting said output voltage output from said voltage converter; and control means conducting feedback control of said voltage converter in the manner that said output voltage is equal to said first target voltage, said feedback control conducted, in a case where a first deviation between said first target voltage and said detected output voltage is larger than a predetermined value, by changing a second target voltage of said voltage converter in such a manner that a second deviation between said second target voltage and said output voltage decreases, wherein said control means controls said voltage converter, in a case where said detected output voltage decreases below said first target voltage, so that said output voltage is equal to said first target voltage by conducting first feedback control and second feedback control, said first feedback control refers to feedback control of said voltage converter executed by changing said second target voltage in such a manner that said second deviation is at most said predetermined value, and said second feedback control refers to feedback control of said voltage converter executed, in a case where said detected output voltage having been decreasing starts to increase, by changing said second target voltage in such a manner that the rate of change of said second target voltage is at most a standard value.

2. The voltage conversion device according to claim 1, wherein in the case where said first deviation is larger than said predetermined value, said control means conducts said first feedback control using said second target voltage determined by adding said predetermined value to said detected output voltage.

3. The voltage conversion device according to claim 1, wherein said output voltage is input to an inverter driving an AC motor.

4. The voltage conversion device according to claim 3, wherein said AC motor is a motor for a vehicle.

5. A computer-readable recording medium having a program recorded thereon for a computer to control voltage conversion from a DC voltage from a DC power supply into an output voltage in such a manner that said output voltage is equal to a first target voltage, said computer executing:

a first step of detecting said output voltage; and a second step of conducting feedback control of a voltage converter converting said DC voltage into said output voltage, said feedback control conducted, in a case where a first deviation between said first target voltage and said detected output voltage is larger than a predetermined value, by changing a second target voltage of said voltage converter in such a manner that a second deviation between said second target voltage and said output voltage decreases, wherein said second step includes:

a first sub-step of calculating said first deviation;

a second sub-step of detecting that said first deviation is larger than said predetermined value;

a third sub-step of conducting feedback control of said voltage converter by changing said second target voltage in such a manner that said second deviation is at most said predetermined value; and a fourth sub-step of conducting feedback control of said voltage converter, in a case where said detected output voltage having been decreasing starts to increase, by changing said second target voltage in such a manner that the rate of change of said second target voltage is at most a standard value.

6. The computer-readable recording medium according to claim 5, wherein said third sub-step includes the steps of:

calculating said second target voltage by adding said predetermined value to said detected output voltage; and conducting feedback control of said voltage converter using said calculated second target voltage.

7. The computer-readable recording medium according to claim 5, wherein said fourth sub-step includes the steps of:

detecting that said output voltage having been decreasing starts to increase;

calculating a difference between a third target voltage at a first control timing and a fourth target voltage at a second control timing preceding said first control timing;

comparing said difference with said standard value;

calculating said third target voltage, in a case where said difference is larger than said standard value, by adding said standard value to said fourth target voltage;

calculating said third target voltage, in a case where said difference is at most said standard value, by adding said predetermined value to said detected output voltage; and conducting feedback control of said voltage converter using said calculated third target voltage.

8. The voltage conversion device according to claim 2, wherein said output voltage is input to an inverter driving an AC motor.

9. The computer-readable recording medium according to claim 6, wherein said fourth sub-step includes the steps of:

detecting that said output voltage having been decreasing starts to increase;

calculating a difference between a third target voltage at a first control timing and a fourth target voltage at a second control timing preceding said first control timing;

comparing said difference with said standard value;

calculating said third target voltage, in a case where said difference is larger than said standard value, by adding said standard value to said fourth target voltage;

calculating said third target voltage, in a case where said difference is at most said standard value, by adding said predetermined value to said detected output voltage; and conducting feedback control of said voltage converter using said calculated third target voltage.

* * * * *